(12) United States Patent
Anderson, Sr. et al.

(10) Patent No.: US 8,722,795 B1
(45) Date of Patent: May 13, 2014

(54) DRY-ERASE SURFACE COMPOSITION AND METHOD OF APPLYING

(75) Inventors: Andy W. Anderson, Sr., Villa Rica, GA (US); Michael B. Winchester, Canton, GA (US); Thomas Jeffrey Smythe, Hendersonville, TN (US)

(73) Assignee: Exhibit One, Inc., Austell, GA (US)

( * ) Notice: Subject to any disclaimer, the term of this patent is extended or adjusted under 35 U.S.C. 154(b) by 180 days.

(21) Appl. No.: 13/440,577

(22) Filed: Apr. 5, 2012

Related U.S. Application Data

(60) Provisional application No. 61/502,584, filed on Jun. 29, 2011.

(51) Int. Cl.
*C08G 18/08* (2006.01)

(52) U.S. Cl.
USPC ........... 524/591; 524/507; 524/589; 524/839; 524/840; 524/906; 428/423.1

(58) Field of Classification Search
USPC ................. 524/507, 589, 591, 839, 840, 906; 428/423.1
See application file for complete search history.

(56) References Cited

U.S. PATENT DOCUMENTS

| | | |
|---|---|---|
| 4,123,590 A | 10/1978 | Hasegawa et al. |
| 4,716,056 A | 12/1987 | Fox et al. |
| 5,037,702 A | 8/1991 | Pitts et al. |
| 6,103,327 A | 8/2000 | Bragole et al. |
| 6,114,436 A * | 9/2000 | Roesler .......................... 524/588 |
| 6,265,074 B1 | 7/2001 | Shah et al. |
| 6,312,815 B1 | 11/2001 | Macris et al. |
| 2011/0300294 A1* | 12/2011 | Nachtman et al. ............ 427/189 |

* cited by examiner

*Primary Examiner* — Michael L Leonard
(74) *Attorney, Agent, or Firm* — Smith Gambrell & Russell LLP

(57) ABSTRACT

A dry erase writing surface is formed from a single component, 100% solids polyurethane, ambient cured, dry erase paint composition having at least ninety percent by weight low NCO isocyanate, a cure accelerating catalyst and a defoaming agent. The surface is ready for use in a day. The composition can additionally contain a diluent, vegetable oil or mineral spirits. The coating has a VOC of between 0 and 49 g/l. The coating is initially applied to the surface of the substrate to form a film thickness of 1-3 mils. The whiteboard is characterized as when tested by erasure of the dry erase markers, the marks are virtually invisible after 2500 cycles. The composition can be packaged as a kit with applicators.

8 Claims, No Drawings

DRY-ERASE SURFACE COMPOSITION AND METHOD OF APPLYING

FIELD OF THE INVENTION

This invention generally relates to a dry erase writing surface. More particularly, the invention relates to a single component, 100% solids polyurethane, ambient cured, dry erase paint and a method for converting a conventional wall or other surface to a surface having the characteristics of a manufactured dry erase surface.

BACKGROUND OF THE INVENTION

Dry erase surfaces have virtually replaced chalkboards as the preferred writing surface for corporate use, training centers, schools, and a wide range of other end uses. Dry erase surfaces are most commonly provided in pre-manufactured board sizes. Conventional dry erase surfaces include porcelain, ceramic, melamine, and polyvinyl chloride (PVC). Dry erase PVC based wall coverings can also be used to create a dry erase surface. Other known dry erase coatings are two-part epoxy coatings. For example, U.S. Pat. No. 6,265,074, issued to Shah, et al. discloses a dry erase, two part epoxy coating that is applied to a flexible substrate to which an adhesive is applied. Similarly, U.S. Pat. No. 6,312,815 issued to Macris et al. and U.S. Pat. No. 4,716,056 issued to Fox et al. disclose two-part epoxy coatings that may be applied to treated and untreated surfaces. Two-part epoxy type coatings are impractical in the field, requiring highly skilled labor and specific equipment for mixing and application. Furthermore, once the two parts of the epoxy are mixed, the product has a very limited pot life measured in hours, not days or weeks. Other coatings "proposed" for dry erase applications specify they be either in a water-based carrier or a solvent-based carrier.

Other methods of producing dry erase surfaces include fire-coated glazes, such as that disclosed in U.S. Pat. No. 4,123,590 issued to Hasegawa et al. As disclosed by U.S. Pat. No. 5,037,702, issued to Pitts et al., other one part coatings in the art require specialized curing such as high temperatures, ultraviolet (UV), and/or electron beam (EB) curing lights in order to exhibit favorable dry erase characteristics. For example, U.S. Pat. No. 6,103,327 issued Bragole et al. discloses a thermally cured paint. White is the predominate color being sold and utilized.

Pre-manufactured dry erase boards provide varying levels of performance over their life, depending on the writing surface used. With the less expensive melamine boards, performance is compromised for a lower price. The primary limitation on all pre-manufactured dry erase boards is that a customer is limited to only the sizes offered. While a dry erase wallcovering can be installed to cover an entire wall surface, corner to corner and floor to ceiling, a dry erase wallcovering requires an expensive installation utilizing skilled labor. Failure of the dry erase surface of the wallcovering will require removal of the dry erase wallcovering, wall preparation, and re-hanging new a dry erase wallcovering.

The inks of the typical, dry erase markers, such as Sanford Expo dry erase marker (Sanford Division of Newell Rubbermaid, Inc., 2707 Butterfield Road, Oak Brook, Ill. 60523) will not penetrate a dry erase surface, thereby erasing is accomplished with minimal effort. Those standard markers will not "ghost", and cleaners, such as Sanford Blue Expo white board cleaner (containing 2-Butoxy Ethanol/Acetate, Isopropyl Alcohol), may be used to maintain dry erase surfaces.

BRIEF SUMMARY OF THE INVENTION

The invention comprises a single component, 100% solids polyurethane, ambient cured, dry erase paint that may be applied to a surface by conventional painting techniques including brushing or rolling, to impart or improve the dry erase characteristics of the surface. It is neither a solvent-based nor a water-based composition. The claim of solvent free is based on VOC's being below the limit of detectability of EPAS method 24. The VOC is between 0 and 49. The dry erase paint of the present invention may be applied to many surfaces including gypsum wall board, chalkboards, whiteboards, dry erase PVC wallcoverings and other plastic surfaces, metal, medium density fiberboard (MDF), masonry, stone, and any number of other wall or display surfaces. If desired, a diluent can be employed with the polyurethane to achieve a desired viscosity. The dry erase paint of the invention is typically dry to touch in around eight hours and the surface is usable within a day (24 hours) depending on conditions. The open time of the dry erase paint of the invention is typical of latex paint, e.g. 4-5 hours. A single component coating for the purposes of the invention is one which is ready to use without premixing in contrast to a two-component coating material where, owing to high reactivity of, binder component and crosslinker components have to be kept in separate vessels. The two components are not mixed until shortly before application, when they react generally without additional activation. A "solvent free one part coating composition" of the invention is also intended to be water-free in the sense of not being a solvent-based or water based composition.

The paint of the present invention has inherent properties of hardness, moisture resistance, chemical resistance, and abrasion resistance which together produce a superior dry erase surface. It cures, under ambient conditions, to a glossy hard shell finish that provides a durable dry erasable painted surface. The surface hardens as the formulation of the dry erase paint continues to cross link and harden, typically requiring a 24 hour minimum curing time before the surface can be used. This can vary since ambient conditions are employed. In contrast, most two component systems, which require a separate catalyst, require seven days before the surface is ready for marker use.

The dry erase paint of the present invention exhibits superior release properties; meaning that a standard dry erase marker, such as the Sanford Expo BOLD, LOW ODOR, or BULLET dry erases markers (Sanford Division of Newell Rubbermaid, Inc., 2707 Butterfield Road, Oak Brook, Ill. 60523) will not penetrate the surface, thereby permitting erasure of the marks with minimal effort. When used with the formulation of the paint of the present invention, those standard markers will not "ghost", i.e. leave residual marks. The dry erase paint of the present invention may be used by any commercial painting contractor and particularly lends itself to home and other do-it-yourself applications, who are unlikely to invest in the costly equipment required for two-part epoxy finishes or prohibitively expensive curing systems required for other one part compositions, such as UV and EB.

While white is typically the color of choice for dry erase displays, the dry erase paint composition of the present invention is available as a clear coating to be applied over any color substrate, or it is amenable to receiving tints and pigments so that the final dry erase surface may have an unlimited color selection suitable for the desired display application. The coating can be transparent or tinted to an unlimited number of translucent or opaque colors if made with pigments or pigment dispersions free of water and hydroxyl content. For example, a display conveying warnings may be colored red and a display conveying safety information may be colored green. In an educational or corporate environment, team or institutional colors may be popular choices.

The "white board" paint of the invention can, if desired, be packaged in kit form. The components of the kit can include written instructions, paint applicator, e.g. brush, roller, foam applicator, etc. The actual components included in the kit are based on a desired application. The kit can also be packaged to include material and material amounts which are suitable for repair of a preexisting whiteboard. The amount of paint included in the container can be based on the surface to be treated. Since there is no premixing requirement like two-component systems (ones that include a separate catalyst or agent), any unused paint can be saved for further use in the original container by resealing the container.

As with any painting project, the surface being painted should be free of dirt, oils, debris, and other contaminants. The area surrounding the surface to be painted should be substantially free of residual dust, particulates, or other construction debris floating in the air because they may adhere to the paint and create unwanted particles that would be detrimental to the suitability of the resultant dry erase writing surface. A smooth surface is desired; any pretreatment, e.g. sanding, spackling, etc., should be attended to prior to application of the paint.

To obtain the best results, a suitable primer coat should be applied to the surface prior to applying the paint of the present invention. In tests, a coat of Zinser Prime Coat 2 acrylic latex primer was applied to drywall and permitted to dry for 24 hours before applying the paint of the present invention.

A moderate coat of the dry erase paint of the present invention may be applied to the substrate by any conventional painting methods such as brushing or rolling. But the best results were experienced by rolling using a closed-cell melamine foam roller cover, supplied by Quali-Tech Mfg. Because the dry erase paint produces very minimal odor and has a VOC (volatile organic compounds), of between zero and 49 g/l, the dry erase paint can be applied in occupied spaces just like standard latex interior paint, as long as the proper ventilation is present. A suitably smooth dry erase surface may be obtained with a single coat of the dry erase paint applied with a high density foam roller, such as those provided by Quali-Tech Mfg., which minimizes coating thickness and insures surface smoothness. Ideally this application technique will achieve a desired coating thickness of between about 1-3 mils. If too light a coat is applied the desired dry erase properties are compromised. Whereas, application of too heavy a coat causes the curing time to be extended and the coverage area for a given volume of paint reduced. Ideally a single coat is applied at the desired thickness.

After the dry erase paint has been applied to the substrate, the resulting dry erase writing surface should be allowed to dry for at least 24 hours (1 day) before using. The drying times depend on conditions. It is possible to prepare a surface suitable for use in 24 hours. The surface can be dry to the touch in just eight hours. The drying time period allows the necessary cross linking to take place resulting in a high performing writable/erasable surface.

Unlike conventional dry erase boards and surfaces, should the painted surface contemplated by the present invention ever fail to perform due to mistreatment or accidental damage, the surface can be readily re-painted, bringing the surface back to its original level of performance. Indeed, the dry erase paint of the present invention may be used to repair or restore a conventional dry erase surface that had been damaged or otherwise had its dry erase properties diminished through excessive, and in some instances routine use. This is a much more economical repair than conventional methods, particularly with respect to PVC dry erase wallcoverings that typically require the complete removal of the wall covering, repairing and prepping the wall surface to a level five finish, and re-hanging the PVC dry erase wallcovering.

The coating has additional uses, such as anti-graffiti coating, clean room coating, industrial wall, and educational wall and floor coatings. The treatable surfaces include properly prepared gypsum board, chalk board, whiteboard, metal, glass, fiberboard, concrete, stone, wood and tile.

DETAILED DESCRIPTION OF THE INVENTION

Normally pure Isocyanate in a range above 90% of the total coating formulation is not considered a viable coating option due to a variety of factors. Isocyanate by itself will not dry or cure in a reasonable time period when applied, so components such as driers and catalysts must be added. However, adding a mineral spirit-like solvent or a vegetable oil, e.g. sunflower oil, to Isocyanate as a diluent and flow and leveling agent addresses the drying and curing issues. This solution was not apparent in the prior art. The fact that an isocyanate has been modified with sunflower oil and then packaged without gelling, solidification or viscosity increase is an achievement. Normally, the hydroxyl content in the oil is naturally reactive with isocyanates, the results of which create increased viscosity and solidification in the can. Additionally, the coating formulation can be made without the use of a diluent, such as mineral spirits or vegetable oil. This simpler method of making the dry erase coating is as effective as the coatings made with a diluent. The advantages of eliminating the diluent are three-fold: The VOC drops to 5 g/l or less, the coating becomes a 100% solids formulation, and the coating contains none of the restricted chemical components: acrolein, acrylonitrile, antimony, benzene, butyl benzyl phthalate, cadmium, di (2-ethylhexyl) phthalate, di-n-butyl phthalate, di-n-octyl phthalate, 1,2-dichlorobenzene, diethyl phthalate, dimethyl phthalate, ethylbenzene, formaldehyde, hexavalent chromium, isophorone, lead, mercury, methyl ethyl ketone methyl isobutyl ketone, methylene, chloride, naphthalene, toluene (methylbenzene), 1,1,1-trichloroethane and vinyl chloride.

Four factors contribute to the avoidance of gelling, solidification or viscosity increase: 1) A low hydroxyl content in the oil; 2) The reaction of the remaining hydroxyl groups in the alkyd with the moisture scavenger before blending with the isocyanate; 3) The use of a lower NCO content isocyanate; and 4) a lower NCO content isocyanate which has a lower degree of crosslinking and reactivity, therefore a reduced viscosity increase.

Isocyanate as the main coating component will generate carbon dioxide off gassing, creating foaming in the finished coating. The foaming can be read as bubbles, which not only create a visually poor surface, but they compromise performance in that they leave open areas (pores) and create difficult to clean texture in the coating surface. Foaming associated with this coating can be controlled in a variety of ways. One of the critical factors of foaming is the percent of the NCO content of the formulation. The Bayhydur 302, and other compatible ISO's, e.g. BASF HA 200, have an NCO content of 17% (17.3+/−0.5% per specification) or less. The desired isocyanates have a viscosity between 500 and 2500 centipoise. Many isocyanates that might be candidates for our coating can have an NCO content in excess of 20%. In addition to incorporating a low NCO content isocyanate, a diluent, e.g. vegetable oil, can be combined with the Isocyanate. Of the vegetable oils, Sunflower oil is preferred. Assuming the sunflower oil is 100% by weight solids, the diluted NCO content is 16.4% based on a weighed average of a blend of 95 parts isocyanate and 5 parts oil. Foaming is proportional to NCO content as one NCO moiety reacts with atmospheric water to produce one molecule of carbon dioxide gas.

Sunflower oil is preferred because of its low yellowing tendency. Other suitable vegetable oils include soybean oil, linseed oil, safflower oil and other drying oils. Near 100% solids alkyds might also be appropriate as a diluent.

Since bubbling relates, in part, to NCO concentration, it can be controlled. With the proper ratio of Isocyanate, catalyst, and Byk siloxane, the coating can also be applied virtually bubble free. Further, the suggested diluent options, mentioned above, are effective in altering the viscosity of the coating.

A second contributing factor to foaming is film thickness. Lower viscosity and consistent application thickness reduce foaming. The slight modification with sunflower oil and the siloxane additive help produce lower, more consistent film thickness and also helps with the defoaming and carbon dioxide release properties of the coating.

By requiring the use of a high density, melamine foam roller cover for the coating application, one is also able to control film thickness and the ultimate surface smoothness.

By maintaining a wet film thickness of 1-3 mils (Calculated film thickness at 200 square feet per quart is 3 mils) the foaming aspect of the isocyanate is kept in check.

The mixer used is a high-speed disperser with a toothed steel or stainless steel blade. The teeth are typically triangular or rectangular, perpendicular to the circumference of the blade, and alternate being turned up and down. Optimum blade tip speed is 4800 to 5300 feet per minute. Optimum blade diameter is $\frac{1}{3}$ of the batch tank diameter with the blade immersed $\frac{1}{2}$ the depth of the liquid. Optimum power is about $\frac{1}{10}$ HP per gallon. (These requirements can be modified or relaxed for the production of a clear, unpigmented coating.)

The examples which follow detail step by step preparation of a pigmented premix, which after standing overnight so that any moisture and hydroxyl content is consumed, is added to the isocyanate. The final ingredient is line 18. In addition to the moisture scavenger, the process is conducted under dry atmosphere, which may be used from the beginning. However, this is less critical. The dry erase surface is tested by erasure of the dry erase markers and the marks are virtually invisible after 2500 cycles.

EXAMPLE 1

The one part coating where a vegetable oil is present as a diluent was prepared as follows. The preferred amount is set forth in terms of parts. Amounts within the range are expected to produce the desired results and purpose.

| Ingr./Instr. | Parts | Range | Description | Purpose |
|---|---|---|---|---|
| Combine the following, high speed disperse for 10 minutes | | | | |
| Sunflower oil | 4.622 | 1.000-40.000 | Sunflower oil. [Substitute: possible alternatives include one or more of the following but are not limited to tall oil fatty acid, soy bean oil, linseed oil, safflower oil, and other drying oils] | Reactive diluent |
| Zirconium catalyst | 0.023 | .010-1.000 | Zirconium carboxylate, solution of, 24% zirconium content [Substitute: zirconium octoate or naphthenate] | Polymerization catalyst |
| Cobalt catalyst | 0.023 | .010-1.000 | Cobalt carboxylate, solution of, 12% metal content [Substitute: cobalt octoate or naphthenate] | Autooxidation catalyst |
| Then add and mix 20 minutes. Allow to stand overnight. | | | | |
| Dabco T12 | 0.051 | 0.000-1.000 | Dibutyltin dilaurate [Substitute: Tin octoate or bismuth octoate] | Catalyst to accelerate cure |
| Incozol 2 | 0.046 | 0.000-2.000 | 3-ethyl-2-methyl-2-(3-methylbutyl)-1, 3-oxazolidine [Substitute: benzenesulfonyl isocyanate, 4-methyl-] | Dessicant |
| Allow to stand 24 hours | | | | |
| Add the above premix while mixing under dry atmosphere to: | | | | |
| Bayhydur 302.1 | 83.304 | 30.000-100.000 | Homopolymer of hexamethylene diisocyanate | Primary resin/polymer |
| Bayhydur 302.2 | 11.856 | 3.500-18.000 | Polyisocyanate based on polyether modified hexamethylene diisocyanate | |
| Then add | | | | |
| Byk 322 | 0.074 | 0.100-2.000 | Aralkyl modified polymethylalkylsiloxane | Surface tension reduction and defoaming additive |
| Mix 10 minutes | | | | |
| Cast three mil film; check for craters, trash, film clarity, and color. | | | | |
| Fill under dry atmosphere | | | | |
| | 100.000 | | | |

EXAMPLE 2

The one part coating where a vegetable oil is present as a diluent was prepared as follows. The preferred amount is set forth in terms of parts. Amounts within the range are expected to produce the desired results and purpose.

| Ingr./Instr. | Parts | Range | Description | Purpose |
|---|---|---|---|---|
| Combine the following, high speed disperse or media mill to 7 Hegman fineness of grind | | | | |
| Alkyd | 0.500 | 1.000-40.000 | Alkyd being a condensation polymerization product of a fatty acid and a polyol. Acceptable fatty acids include one or more of the following but are not limited to tall oil fatty acid, soy bean oil, linseed oil, or safflower oil. Polyols may include but are not limited to glycerol, ethylene glycol, or pentaerythritol. | Reactive diluent |
| Polyurethane alkyd | 3.000 | 1.000-40.000 | Aliphatic urethane modified alkyd being an extension polymerization product of an alkyd and an aliphatic isocyanate monomer such as hexamethylene diisocyanate or isophorone diisocyanate. | Reactive diluent |
| Titanium dioxide | 2.000 | 0.000-25.000 | Titanium dioxide pigment, micronized, paint grade, suitable for gloss paints and coatings. | White pigment |
| Aprotic solvent(s) | 3.000 | 1.000-50.000 | One or more aprotic solvents selected from, but not limited to mixed isomers of xylene (CAS #1330-20-7), aromatic naphtha (64742-95-6), light aliphatic solvent naphtha (64742-89-8), stoddard solvent (8052-41-3), tertiary butyl acetate (540-88-5), dimethyl carbonate (616-38-6) | Solvent |
| Organoclay | 0.050 | .100-5.000 | Micronized pigment comprised of organically treated hectorite clay [Substitute: amorphous fumed silica with surface area of 200-380 m2/g] | Antisettling/antisag additive |
| Driers | 0.010 | .010-1.000 | One or more metallic driers selected from but not limited to naphthenates or octoates of cobalt or zirconium | Oxidative catalyst |
| Fluoropolymer | 0.080 | 0.00-5.000 | Micronized polymer of tetrafluoroethylene, perfluoroalkoxy, or fluorinated ethylene propylene. | |
| Then add and mix 20 minutes. Allow to stand overnight. | | | | |
| Dabco T12 | 0.050 | 0.000-1.000 | Dibutyltin dilaurate [Substitute: Tin octoate or bismuth octoate] | Catalyst to accelerate cure |
| Additive TI | 0.077 | 0.000-2.000 | Benzenesulfonyl isocyanate, 4-methyl- [Substitute: oxazolidine] | Dessicant |
| Allow to stand 24 hours | | | | |
| Add the above premix while mixing under dry atmosphere to: | | | | |
| Bayhydur 302.1 | 80.800 | 30.000-100.000 | Homopolymer of hexamethylene diisocyanate | Primary resin/polymer |
| Bayhydur 302.2 | 11.500 | 3.500-18.000 | Polyisocyanate based on polyether modified hexamethylene diisocyanate | |
| Then add | | | Diisocyanate | |
| Byk 320 | 0.135 | 0.100-2.000 | Polyether modified polymethylalkylsiloxane, solution | Flow, leveling, and defoaming additive |
| Mix 20 minutes | | | | |
| Cast three mil film; check for craters, trash, film clarity, and color. | | | | |
| Fill under dry atmosphere | | | | |
| | 101.202 | | | |

EXAMPLE 3

Combine the following using a high speed mixer for 10 minutes to disperse the ingredients under a dry atmosphere:

| | |
|---|---|
| 99.85% | Isocyanate (Bayhydur 302) |
| .096% | Catalyst (Dabco T-12) |
| .059% | Silicone (Byk 320) |

Fill the remainder into a container under dry atmosphere.

While the amounts are set forth as specified percentages, the amounts should be considered as approximately (about) the specified value.

If diluent is desired, odorless mineral spirits or equivalent can be present in an amount around 4%.

Although the invention has been described and illustrated in detail, it should be recognized changes which depart from the specifics of the examples and other taught embodiments are possible without departing from the spirit of the invention as described above. The spirit and scope of the present invention are to be limited only by the terms of the claims which follow.

The invention claimed is:

1. A kit for preparing a surface which has dry erase properties comprising a container including therein a solvent free dry erase paint composition, characterized as a one component coating, consisting essentially of between 98-99.85% by weight of an isocyanate, a cure accelerating catalyst and a defoaming agent, wherein the isocyanate has a NCO content of about 17% or less, the cure accelerating catalyst and defoaming agent are present in amounts which produce a film thickness on a substrate, when still wet, of 1-3 mils, which upon drying for at least 24 hours at an ambient temperature forms a dry erase bubble free surface that is ready for use and where marks formed on the surface by dry erase markers are virtually invisible after 2500 cycles.

2. The kit according to claim 1 further comprising a roller and/or brush.

3. The kit according to claim 1 further comprising materials and written instructions for affecting repairs and/or surface treatment.

4. The kit according to claim 1, wherein the container includes an inert gas with the composition.

5. A kit for preparing a surface which has dry erase properties comprising a container including a solvent free dry erase paint composition comprising between 98-99.85% by weight of an isocyanate, a cure accelerating catalyst, a defoaming agent and a diluent, wherein the isocyanate has a NCO content of about 17% or less, the cure accelerating catalyst and defoaming agent are present in amounts, which produce a film thickness, when still wet, of 1-3 mils, which upon drying at an ambient temperature for at least 24 hours forms a dry erase bubble free surface that is ready for use and where marks formed by dry erase markers are virtually invisible after 2500 cycles and wherein the paint composition is a one component coating.

6. The kit according to claim 5 wherein the diluent is odorless mineral spirits or vegetable oil.

7. The kit according to claim 1, Wherein the cure accelerating catalyst is selected from dibutylin dilaurate, tin octoate or bismuth octoate and the defoaming agent is siloxane.

8. The kit according to claim 1, wherein the composition has a VOC of less than 5 g/l.

\* \* \* \* \*